(12) United States Patent
Feng et al.

(10) Patent No.: US 12,554,901 B2
(45) Date of Patent: Feb. 17, 2026

(54) METHOD AND SYSTEM FOR THREE-DIRECTIONAL DISPLACEMENT MONITORING OF BUILDING BY FUSION OF InSAR DATA AND PHYSICAL KNOWLEDGE

(71) Applicant: Southeast University, Jiangsu (CN)

(72) Inventors: Decheng Feng, Jiangsu (CN); Yanan Du, Jiangsu (CN); Gang Wu, Jiangsu (CN)

(73) Assignee: Southeast University, Jiangsu (CN)

( * ) Notice: Subject to any disclaimer, the term of this patent is extended or adjusted under 35 U.S.C. 154(b) by 0 days.

(21) Appl. No.: 19/007,538

(22) Filed: Jan. 1, 2025

(65) Prior Publication Data
US 2025/0328699 A1  Oct. 23, 2025

(30) Foreign Application Priority Data
Apr. 17, 2024 (CN) .......................... 202410458840.6

(51) Int. Cl.
G06F 30/13 (2020.01)
G01B 15/06 (2006.01)
(Continued)

(52) U.S. Cl.
CPC ............ G06F 30/13 (2020.01); G01S 13/904 (2019.05); G01B 15/06 (2013.01); G01S 13/9021 (2019.05);
(Continued)

(58) Field of Classification Search
None
See application file for complete search history.

(56) References Cited

U.S. PATENT DOCUMENTS 6,011,505 A * 1/2000 Poehler ............... G01S 13/9019
342/25 C
6,150,972 A * 11/2000 Bickel ................. G01S 13/9023
342/25 C
(Continued)

FOREIGN PATENT DOCUMENTS

CN     106772377         5/2017
CN     106772377 A  *    5/2017
(Continued)

OTHER PUBLICATIONS

Di Carlo, F., Miano, A., Giannetti, I. et al. On the integration of multi-temporal synthetic aperture radar interferometry products and historical surveys data for buildings structural monitoring. J Civil Struct Health Monit 11, 1429-1447 (2021). https://doi.org/10.1007/s13349-021-00518-4 (Year: 2021).*
(Continued)

Primary Examiner — Akash Saxena
(74) Attorney, Agent, or Firm — JCIPRNET (57) ABSTRACT

Provided method and system for three-directional displacement monitoring of building by fusion of InSAR data and physical knowledge. Time-series LOS-directional deformation displacement of region of study, where building to be monitored is located, from each orbit is acquired based on periodical observation data of SAR satellite; time-unified LOS-directional time-series deformations from plurality of orbits are acquired using interpolation method; deformations in vertical and east-west directions are solved by establishing observation equation using interpolated multi-orbital LOS-directional deformation data; ratio of major-axis-directional deformation to minor-axis-directional deformation is calculated by calculating major-axis stiffness and minor-axis stiffness of each standard storey of building structure according to building structure plan, and establishing priori model of building structure using Equivalent Lateral Force
(Continued)

method; deformation displacement of building structure in south-north direction is solved based on two-dimensional deformation result and with established priori model of building. The present invention can efficiently and accurately monitor building deformation.

7 Claims, 5 Drawing Sheets

(51) Int. Cl.
  G01S 13/90 (2006.01)
  G06F 30/23 (2020.01)
  G06F 119/14 (2020.01)
  G06T 5/50 (2006.01)
  G06T 7/70 (2017.01)
  G06V 20/13 (2022.01)

(52) U.S. Cl.
  CPC .......... *G01S 13/9023* (2013.01); *G06F 30/23* (2020.01); *G06F 2119/14* (2020.01); *G06T 5/50* (2013.01); *G06T 7/70* (2017.01); *G06T 2207/10044* (2013.01); *G06V 20/13* (2022.01)

(56) References Cited

U.S. PATENT DOCUMENTS

| | | | | |
|---|---|---|---|---|
| 9,014,415 | B2* | 4/2015 | Chen | G06T 7/0002 |
| | | | | 382/100 |
| 9,036,861 | B2* | 5/2015 | Chen | G06T 7/0002 |
| | | | | 382/100 |
| 11,461,964 | B2* | 10/2022 | Pennings | G06T 5/50 |
| 12,055,624 | B2* | 8/2024 | Ma | G06T 7/13 |
| 12,270,897 | B1* | 4/2025 | Zuo | G01S 13/9023 |
| 12,306,293 | B1* | 5/2025 | Du | G06T 7/55 |
| 2003/0122700 | A1* | 7/2003 | Moreira | G01S 13/904 |
| | | | | 342/25 R |
| 2006/0034546 | A1* | 2/2006 | Vedula | G06F 30/23 |
| | | | | 382/296 |
| 2010/0063733 | A1* | 3/2010 | Yunck | G01S 13/90 |
| | | | | 701/469 |
| 2010/0162640 | A1* | 7/2010 | Drysdale | E02D 27/34 |
| | | | | 52/167.7 |
| 2012/0319893 | A1* | 12/2012 | Yun | G01S 13/9023 |
| | | | | 342/25 C |
| 2015/0057981 | A1* | 2/2015 | Gross | G01S 19/48 |
| | | | | 703/1 |
| 2015/0268340 | A1* | 9/2015 | Bruyere | G01S 13/9023 |
| | | | | 342/25 C |
| 2016/0033639 | A1* | 2/2016 | Jung | G01S 13/9023 |
| | | | | 342/25 C |
| 2020/0394780 | A1* | 12/2020 | Sowter | G01S 13/9027 |
| 2021/0011149 | A1* | 1/2021 | Hu | G01S 19/485 |
| 2021/0033726 | A1* | 2/2021 | Jung | G01S 13/9023 |
| 2023/0072382 | A1* | 3/2023 | Jolivet | G06T 5/50 |
| 2023/0091343 | A1* | 3/2023 | Shi | G01S 13/885 |
| | | | | 342/25 A |
| 2024/0142613 | A1* | 5/2024 | Ma | G06F 30/20 |
| 2024/0303385 | A1* | 9/2024 | Feng | G06F 30/13 |
| 2024/0411016 | A1* | 12/2024 | Zhao | G06V 10/50 |
| 2024/0427012 | A1* | 12/2024 | Imaizumi | G01S 13/90 |
| 2025/0037370 | A1* | 1/2025 | Guo | G06T 7/11 |
| 2025/0076492 | A1* | 3/2025 | Su | G01S 13/9023 |
| 2025/0164633 | A1* | 5/2025 | Ma | G01S 13/9023 |

FOREIGN PATENT DOCUMENTS

| | | | | |
|---|---|---|---|---|
| CN | 112835043 | | 5/2021 | |
| CN | 115685201 | | 2/2023 | |
| CN | 116049929 | | 5/2023 | |
| CN | 116449365 | | 7/2023 | |
| CN | 117437508 | | 1/2024 | |
| CN | 118089611 A | * | 5/2024 | G01B 15/00 |

OTHER PUBLICATIONS

V. Cerchiello, G. Tessari, E. Velterop, P. Riccard, M. Defilippi and P. Pasquali, "Risk of building damage by modeling interferometric time series," 2016 IEEE International Geoscience and Remote Sensing Symposium (IGARSS), Beijing, China, 2016, pp. 7334-7337, doi: 10.1109/IGARSS.2016.7730913. (Year: 2016).*
Chen, F.; Wu, Y.; Zhang, Y.; Parcharidis, I.; Ma, P.; Xiao, R.; Xu, J.; Zhou, W.; Tang, P.; Foumelis, M. Surface Motion and Structural Instability Monitoring of Ming Dynasty City Walls by Two-Step Tomo-PSInSAR Approach in Nanjing City, China. Remote Sens. 2017, 9, 371. (Year: 2017).*
Ya-Nan Du, De-Cheng Feng, Gang Wu, "Domain Knowledge Embedded InSAR-Based 3D Displacement Monitoring of Urban Buildings", First published: Feb. 17, 2025, https://doi.org/10.1155/stc/8864614 (Inventors Paper) (Year: 2025).*
Yang, Kui, et al. "Monitoring building deformation with InSAR: Experiments and validation." Sensors 16.12 (2016): 2182. (Year: 2016).*
Fengkai Li et al., "Assessing Land Subsidence-Inducing Factors in the Shandong Province, China, by Using PS-InSAR Measurements", Remote Sens, Jun. 15, 2022, pp. 1-21, vol. 14.
Li; Jiayu et al., "Surface Subsidence Monitoring in Shenyang City Based on InSAR Data Fusion of Elevating R ail Time Series", Geomatics & Spatial Information Technology, with English abstract, Apr. 2021, pp. 91-95, vol. 44, No. 4, Abstract Only in English.
"Notice of Allowance of Japan Counterpart Application", issued on Mar. 27, 2025, with English translation thereof, p. 1-p. 6.

* cited by examiner

METHOD AND SYSTEM FOR THREE-DIRECTIONAL DISPLACEMENT MONITORING OF BUILDING BY FUSION OF InSAR DATA AND PHYSICAL KNOWLEDGE

CROSS-REFERENCE TO RELATED APPLICATION

This application claims the priority benefit of China application serial no. 202410458840.6, filed on Apr. 17, 2024. The entirety of the above-mentioned patent application is hereby incorporated by reference herein and made a part of this specification.

TECHNICAL FIELD

The present invention belongs to the technical field of interferometry synthetic aperture radar (InSAR) data application processing and building safety monitoring, and in particular relates to a method and system for three-directional displacement monitoring of a high-rise building by fusion of InSAR data and physical knowledge.

BACKGROUND

With the advancement of urbanization and economic development, it is more and more common to construct high-rise buildings. As landmarks of modern cities, the high-rise buildings stand for the development level of a city, and bear a large number of people and facilities. However, due to the special structure and complex environment of the high-rise buildings, they are exposed to many potential challenges in structural safety and stability.

The high-rise buildings undergo constant stresses and deformations, and their structures may be affected by factors such as natural disasters, geological conditions, construction quality and environmental changes, leading to three-dimensional deformations. These deformations may be gradually accumulated to bring about potential safety hazards of the structure, or even lead to building collapses and causalities. Therefore, it is of great significance to monitor the three-dimensional deformations of the high-rise buildings.

At present, the conventional methods for monitoring the deformations mainly make use of devices such as total stations, precision level meters, and laser lead-baffled collimators. In view of the special characteristics of ultrahigh-rise buildings, these conventional methods for monitoring have different defects, which are mainly manifested as follows: in case of measurement with an external control method using the total station, it is difficult to aim at a target, the angle of elevation is excessively large to lead to the increased laser angle of divergence, and the accuracy of angle and distance measurement is reduced due to the influences of atmospheric flow and atmospheric refraction, such that the requirements cannot be met; in case of the vertical transfer of a control point by the laser lead-baffled collimator, segmentation is required, leading to the accumulation of errors, such that the required precision cannot be achieved; the intervisibility between adjacent points must be ensured for measurement, and synchronous observation of multiple points is not allowed; and during monitoring, a large number of manpower and devices are required, resulting in large labor intensity, low efficiency and poor economic efficiency. As a result, there is a need for a more scientific, efficient and comprehensive means of high-tech monitoring to provide necessary information for the prevention and control of urban building disasters. With the real-time and comprehensive understanding of the three-dimensional deformations of a high-rise building, structural abnormality and potential safety hazards can be found out in time, such that effective maintenance and repair measures can be taken to ensure the structural safety and service life of the high-rise building.

The interferometry synthetic aperture radar technique has been widely used in the field of ground surface deformation monitoring due to its outstanding capability of acquiring ground surface deformation information. However, when acquiring the deformation data by InSAR, the line of sight (LOS)-directional radar has the problem of vagueness in sensing the deformation of the ground surface in the south-north direction, such that the three-dimensional deformation information of the ground surface cannot be exhibited directly.

SUMMARY

Object of the Invention: In view of the defects of the prior art, an object of the present invention is to provide a method and system for three-directional displacement monitoring of a building by fusion of InSAR data and physical knowledge, where a two-dimensional deformation field is solved by using InSAR data, and a three-dimensional deformation is further solved in combination with a priori model of building structure deformations established based on the physical knowledge, without direct contact with the building during routine monitoring, operation and maintenance of the building, such that the influence and damage to a building structure by a traditional monitoring method are avoided, and the safety of the building is guaranteed.

Technical Solution: In order to achieve the above object of the present invention, the technical solution used in the present invention is as follows.

A method for three-directional displacement monitoring of a building by fusion of InSAR data and physical knowledge includes the steps of:

step 1, acquiring a time-series LOS-directional deformation displacement of a region of study, where a building to be monitored is located, from each orbit based on periodical observation data of an SAR satellite;

step 2, calculating time-unified LOS-directional time-series deformations from a plurality of orbits by performing time-dimensional interpolation on LOS-directional deformation datasets from ascending and descending orbits respectively;

step 3, solving deformations in vertical and east-west directions by establishing an observation equation based on interpolated multi-orbital LOS-directional deformations;

step 4, calculating major-axis stiffness and minor-axis stiffness of each standard storey of a building structure according to a building structure plan;

step 5, calculating a ratio of a major-axis-directional deformation to a minor-axis-directional deformation by establishing a priori model of the building structure using physical knowledge of an Equivalent Lateral Force method and based on the building structure plan; and step 6, solving a deformation displacement of the building structure in a south-north direction in combination with deformation results in the vertical and east-west directions and the priori model of building structure deformations.

As a preference, in step 1, a plurality of SAR image data containing the region of the building to be monitored is acquired by periodical observation; and time-series processing is performed using a differential interferometry small baseline subset time-series analysis SBAS-InSAR method, to acquire the time-series LOS-directional deformation displacement of the region of study, where the building to be monitored, for each orbit.

As a preference, in step 3, the observation equation is:

$$\begin{bmatrix} D_{LOS_1} \\ D_{LOS_2} \end{bmatrix} = \begin{bmatrix} \cos\theta_1 & -\sin\theta_1 \sin\left(\partial_1 - \frac{3}{2}\pi\right) \\ \cos\theta_2 & -\sin\theta_2 \sin\left(\partial_2 - \frac{3}{2}\pi\right) \end{bmatrix} \begin{bmatrix} D_U \\ D_E \end{bmatrix},$$

in which $D_{LOS_1}$ and $D_{LOS_2}$ indicate radar line of sight deformations from the ascending and descending orbits respectively. $D_U$ and $D_E$ indicate deformations in the vertical and east-west directions respectively, $\theta_1$ and $\theta_2$ indicate radar wave incidence angles of the ascending and descending orbits respectively, and $\partial_1$ and $\partial_2$ indicate satellite azimuth angles in the ascending and descending orbits respectively.

As a preference, in step 4, overall lateral stiffness K of a structural storey includes shear stiffness $$K_W = \frac{GA_W}{h}$$

of a shear wall and flexural stiffness $$K_C = \frac{12EI_C}{h^3}$$

of a column member, in which G indicates a shear modulus of a material used in the member, E indicates an elastic modulus of the material used in the member, $A_W$ indicates an effective cross-sectional area of the shear wall in a calculated direction, h indicates a structural storey height, and $I_C$ indicates a horizontal cross-sectional moment of inertia of a column.

As a preference, in step 5, each storey of the building structure is regarded as an independent mass point, and according to the Equivalent Lateral Force method, a horizontal seismic action on a mass point of an $i^{th}$ storey is $$F_i = \frac{H_i G_i}{\sum_{k=1}^{n} H_k G_k} F_{Ek}(1 - \delta_n),$$

in which $H_i$ and $H_k$ indicate calculated heights of mass points, $G_i$ and $G_k$ indicate gravity load values of the mass points, $F_{Ek}$ indicates a standard value of a total horizontal seismic action of the structure, n indicates a total number of storeys of the structure, and $\delta_n$ indicates a top-added seismic action coefficient; and a horizontal deformation of each storey is defined as a ratio of a horizontal shear to the stiffness of the storey, a deformation at a top of the building is a sum of deformations of respective storeys, a minor-axis deformation at the top of the building is $$\Delta x = \sum_{i=1}^{n} \frac{F_i}{K_{ix}},$$

and a major-axis deformation at the top of the building is $$\Delta y = \sum_{i=1}^{n} \frac{F_i}{K_{iy}},$$

in which $K_{ix}$ anu $K_{iy}$ indicate the minor-axis and major-axis stiffness of an $i^{th}$ storey.

As a preference, in step 5, a mass of each storey is assumed to be identical, a gravity load of each storey is regarded as a constant, and a ratio of the minor-axis deformation to the major-axis deformation of the top of the building is $$\frac{\Delta x}{\Delta y} = \frac{\sum_{i=1}^{n} \left(\frac{H_i}{K_{ix}}\right)}{\sum_{i=1}^{n} \left(\frac{H_i}{K_{iy}}\right)}.$$

As a preference, in step 6, three-dimensional deformation relationships of the building in a settlement direction, the major-axis direction and the minor-axis direction are as follows:

$$D_E = \Delta x \cos\beta + \Delta y \sin\beta$$
$$D_N = \Delta x \sin\beta + \Delta y \cos\beta$$
$$D_U = \Delta z,$$

in which $\beta$ indicates an included angle between a horizontal axis of the building and a due east direction, $\Delta x$, $\Delta y$, $\Delta z$ indicate minor-axis, major-axis and settlement deformations of the building respectively, and $D_U$, $D_N$ and $D_E$ indicate deformations in a vertical direction, a south-north direction and an east-west direction, respectively.

As a preference, the method further includes: step 7, acquiring more reliable trend-directional three-dimensional deformation data by performing EMD processing on an acquired original three-dimensional deformation of the building and removing periodical deformations of the building caused by temperature effects.

A system for three-directional displacement monitoring of a building by fusion of InSAR data and physical knowledge to implement the method as defined includes:
an LOS-directional deformation calculation module for acquiring a time-series LOS-directional deformation displacement of a region of study, where a building to be monitored is located, from each orbit based on periodical observation data of an SAR satellite;
an interpolation module for calculating time-unified LOS-directional time-series deformations from a plurality of orbits by performing time-dimensional interpolation on LOS-directional deformation datasets from ascending and descending orbits respectively;
a vertical-/east-west-directional deformation solving module for solving deformations in vertical and east-west directions by establishing an observation equation based on interpolated multi-orbital LOS-directional deformations;

a stiffness calculation module for calculating major-axis stiffness and minor-axis stiffness of each standard storey of a building structure according to a building structure plan;

a major-/minor-axis-directional deformation ratio calculation module for calculating a ratio of a major-axis-directional deformation to a minor-axis-directional deformation by establishing a priori model of the building structure by using physical knowledge of an Equivalent Lateral Force method and based on the building structure plan;

and a south-north-directional deformation solving module for solving a deformation displacement of the building structure in a south-north direction in combination with deformation results in the vertical and east-west directions and the priori model of building structure deformations.

A computer system includes a memory, a processor and a computer program that is stored in the memory and runs on the processor, wherein the computer program, when loaded to the processor, implements the steps of the method for three-directional displacement monitoring of a building by fusion of InSAR data and physical knowledge.

Beneficial effects: Compared with the prior art, the present invention has the following technical effects: the present invention provides the method for three-directional displacement monitoring of a building by fusion of InSAR data and physical knowledge, in order to improve the effectiveness of the InSAR deformation monitoring technique and provide the technique for monitoring the ultrahigh-rise buildings; the present invention establishes a relationship model between the LOS-directional deformation and the three-dimensional deformation of the building by building the three-dimensional deformation space coordinates system in combination with the structural characteristics of the building, and acquires the three-dimensional deformation field of the building in the region of study by using the ascending and descending orbit data of the satellite, without direct contact with the building, such that the influence and damage to the building structure by the conventional monitoring method are avoided and the building safety is guaranteed. The study and development of the method of the present invention are of great significance to guarantee the public safety and improve the reliability and durability of the building structure, and positively promote the sustainable development of a city and the healthy operation of the building works.

DESCRIPTION OF THE EMBODIMENTS

The technical solutions of the present invention will be further described in detail below in conjunction with the accompanying drawings and specific embodiments.

Figure 1:
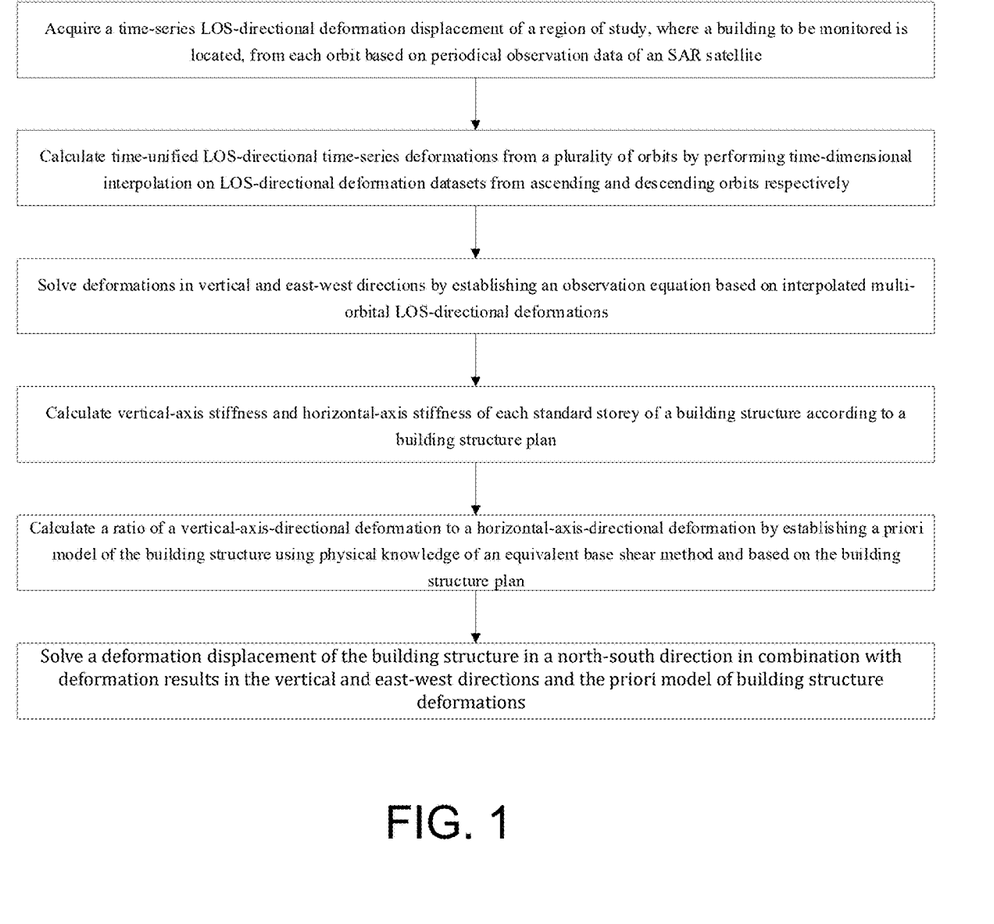
FIG. 1 shows a schematic flowchart according to an embodiment of the present invention.

As shown in FIG. 1, an embodiment of the present invention discloses a method for three-directional displacement monitoring of a building by fusion of InSAR data and physical knowledge, including the steps of:

step 1, acquiring a time-series LOS-directional deformation displacement of a region of study, where a building to be monitored is located, from each orbit based on periodical observation data of an SAR satellite;

step 2, calculating time-unified LOS-directional time-series deformations from a plurality of orbits by performing time-dimensional interpolation on LOS-directional deformation datasets from ascending and descending orbits respectively;

step 3, solving deformations in vertical and east-west directions by establishing an observation equation based on interpolated multi-orbital LOS-directional deformations;

step 4, calculating major-axis stiffness and minor-axis stiffness of each standard storey of a building structure according to a building structure plan;

step 5, calculating a ratio of a major-axis-directional deformation to a minor-axis-directional deformation by establishing a priori model of the building structure using physical knowledge of an Equivalent Lateral Force method and based on the major-axis stiffness and the minor-axis stiffness of each standard storey of the building structure; and step 6, solving a deformation displacement of the building structure in a south-north direction in combination with deformation results in the vertical and east-west directions as acquired by InSAR and the priori model of building structure deformations.

As an example, in step 1, the region where a target building to be monitored is located is periodically observed using a high-resolution SAR satellite, a piece of SAR monitoring image for the ascending orbit and for the descending orbit is acquired for each cycle respectively, and a small baseline subset InSAR (SBAS-InSAR) method is used to perform time-series processing to acquire the time-series LOS-directional deformation displacement of the region of study, where the building to be monitored is located, from each orbit.

In an exemplary example, step 1 includes: first, acquiring no less than 12 pieces of SAR image data containing the region of the high-rise building to be monitored by acquiring a piece of image data of the region of the high-rise building to be monitored by the SAR satellite in each cycle; then, acquiring a monitoring result of the region of the high-rise building to be monitored by performing differential interferometry on all the SAR image data by using SBAS; and afterwards, acquiring the deformation monitoring data of time-series LOS-directional deformation from the ascending and descending orbits.

In step 2, the deformation quantity data including time-dimensional and LOS-directional measurement values is acquired; then, time-dimensional data is preprocessed to ensure that the data is ordered without missing; then, an interpolation function is constructed; and interpolation is performed on a time point to be interpolated by using the interpolation function within a corresponding interval, to obtain a LOS-directional deformation quantity value.

Figure 2:
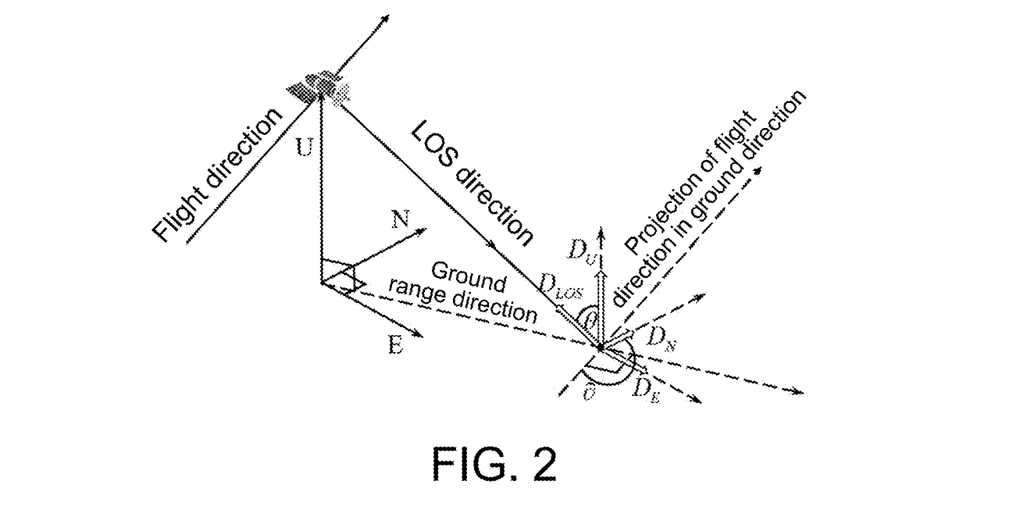
FIG. 2 shows a schematic diagram of three-dimensional decomposition of an LOS-direction deformation according to an embodiment of the present invention.

As can be seen from FIG. 2, the relationship between the LOS-directional deformation and the three-dimensional deformation in an ENU coordinates system satisfies Equation (1):

$$D_{LOS} = D_U \cos\theta - D_N \sin\theta \cos\left(\partial - \frac{3}{2}\pi\right) - D_E \sin\theta \sin \tag{1}$$

$$\left(\partial - \frac{3}{2}\pi\right) = \left[\cos\theta - \sin\theta\cos\left(\partial - \frac{3}{2}\pi\right) - \sin\theta\sin\left(\partial - \frac{3}{2}\pi\right)\right]\begin{bmatrix} D_U \\ D_N \\ D_E \end{bmatrix}.$$

Here, $D_{LOS}$ indicates a radar LOS-direction deformation, $D_U$, $D_N$ and $D_E$ indicate deformations in a vertical direction, a south-north direction and an east-west direction respectively. $\theta$ indicates a radar wave incidence angle, $\partial$ indicates an azimuth angle of the satellite, and $$\partial - \frac{3}{2}\pi$$

indicates the projection direction of the LOS direction on the horizontal plane.

Equation (1) shows the decomposed LOS-directional deformation from a single orbit in the three-dimensional direction, and can be written in a matrix form in case of observation data from a plurality of orbits, as shown in Equation (2).

$$\begin{bmatrix} D_{LOS_1} \\ D_{LOS_2} \\ D_{LOS_3} \end{bmatrix} = \begin{bmatrix} \cos\theta_1 & -\sin\theta_1\cos\left(\partial_1 - \frac{3}{2}\pi\right) & -\sin\theta 1 \sin\left(\partial_1 - \frac{3}{2}\pi\right) \\ \cos\theta_2 & -\sin\theta_2\cos\left(\partial_2 - \frac{3}{2}\pi\right) & -\sin\theta\sin\left(\partial_2 - \frac{3}{2}\pi\right) \\ \cos\theta_3 & -\sin\theta_3\cos\left(\partial_3 - \frac{3}{2}\pi\right) & -\sin\theta\sin\left(\partial_3 - \frac{3}{2}\pi\right) \end{bmatrix}\begin{bmatrix} D_U \\ D_N \\ D_E \end{bmatrix}. \tag{2}$$

At present, the flight direction of the radar satellite in orbit is close to the due north direction, and the LOS direction is perpendicular to the flight direction of the satellite. Under the influence of the configuration of a satellite system, the existing radar satellite is insufficient in the geometric diversity of data imaging, resulting in extremely weak perception of the satellite for the deformation of the monitored point in the south-north direction. In order to guarantee the accuracy of the least squares calculation, the deformation of the above model in the south-north direction is ignored, and the deformations in the vertical and east-west directions are solved by using the data of two orbiting satellites. Equation (2) is simplified to:

$$\begin{bmatrix} D_{LOS_1} \\ D_{LOS_2} \end{bmatrix} = \begin{bmatrix} \cos\theta_1 & -\sin\theta_1\sin\left(\partial_1 - \frac{3}{2}\pi\right) \\ \cos\theta_2 & -\sin\theta_2\sin\left(\partial_2 - \frac{3}{2}\pi\right) \end{bmatrix}\begin{bmatrix} D_U \\ D_E \end{bmatrix}. \tag{3}$$

The interpolation results of the ascending and descending orbits at the same ground point at the same time are substituted into the two-dimensional deformation quantity solving model for solving the two-dimensional deformation quantity of this point at this time.

As an example, in step 3, when the satellite radar scans and images the ground, both the flight azimuth angle $\partial_1$ and the radar incidence angle $\theta_1$ of the satellite at the ascending orbit and the flight azimuth angle $\partial_2$ and the radar incidence angle $\theta_2$ of the satellite at the descending orbit are known quantities that can be found in the data file of SAR images. The deformation quantity of the ground point in the east-west direction is $D_E$, the deformation quantity of the ground point in the vertical direction is $D_U$, and the deformation quantity in the radar LOS direction is the sum of the projections of $D_E$ and $D_U$ in the LOS direction. To acquire the values $D_E$ and $D_U$, the LOS-directional deformation value of the same ground point at the same time acquired by an experiment combining the data of the ascending and descending orbits can be substituted into Equation (3) for calculating the two-dimensional quantity.

In an exemplary example, in step 4, in structural engineering, shear walls are generally designed as main lateral force-resistant members in a structural system. Their geometry and material properties allow them to effectively resist lateral loads, with column members bearing vertical loads and partial lateral loads in the structure. Therefore, the overall lateral stiffness of a structural storey generally needs to be comprehensively considered in two aspects: the shear stiffness of the shear wall and the flexural stiffness of the column member, which are calculated by the equation below:

$$K = K_W + K_C = \frac{GA_W}{h} + \frac{12EI_C}{h^3} = \frac{G}{h}\left[A_W + 2.5\left(\frac{b}{h}\right)^2 \times A_C\right]. \tag{4}$$

Here, $K_w$ indicates the shear stiffness of the shear wall, $K_C$ indicates the flexural stiffness of the column member, G indicates the shear modulus of a material used in the member, E indicates the elastic modulus of the material used in the member, h indicates the structural storey height, b indicates the cross-sectional width of the column, $A_W$ indicates the effective cross-sectional area of the shear wall in a calculated direction, $I_C$ indicates the horizontal cross-sectional moment of inertia of the column, and Ac indicates the horizontal cross-sectional area of the column.

Figure 3:
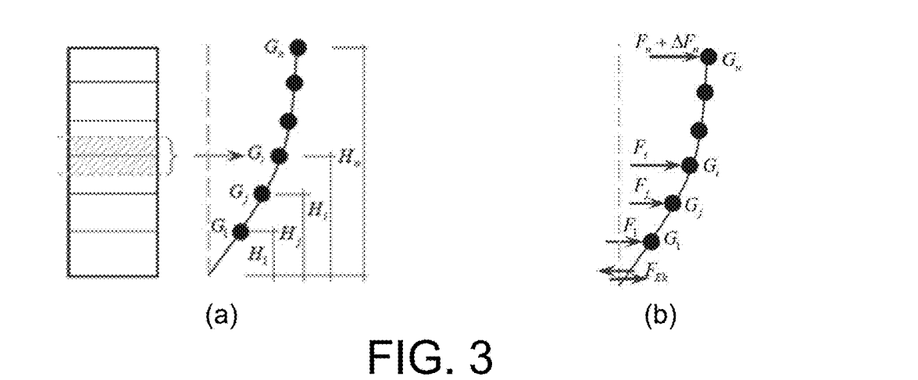
FIG. 3 shows schematic diagrams of an Equivalent Lateral Force method according to an embodiment of the present invention.
Figure 4:
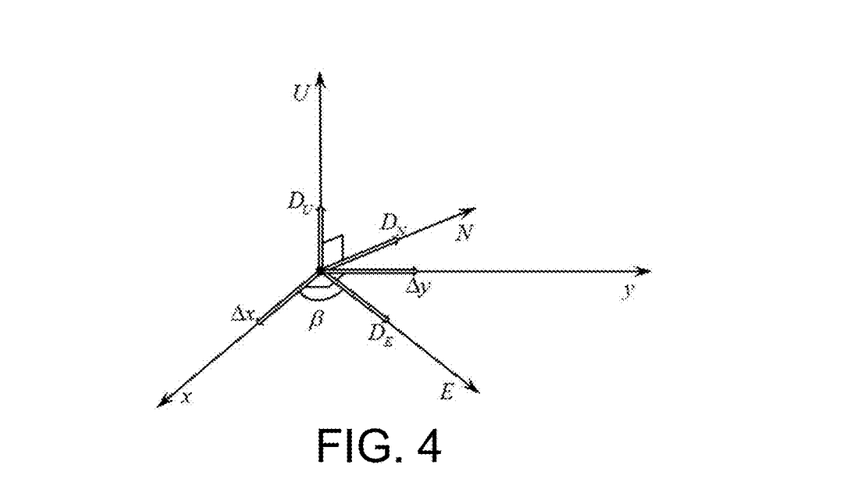
FIG. 4 shows a schematic diagram of a relationship between a building deformation and a space coordinates system according to an embodiment of the present invention.

In step 5, it is assumed that the deformation of the structure under an seismic action is featured with linear elasticity, and the mass of the structure is evenly distributed in each storey; the building structure under the seismic action can be approximated as a single degree of freedom system, with each storey regarded as an independent mass point, and the seismic action is distributed in an inverted triangle form along the height (FIG. 3). According to the Equivalent Lateral Force method, a horizontal seismic action on a mass point of an $i^{th}$ storey is:

$$F_i = \frac{H_i G_i}{\sum_{k=1}^{n} H_k G_k} F_{Ek}. \tag{5}$$

Here, $F_{Ek}$ indicates the standard value of the total horizontal seismic action of the structure, $F_i$ indicates the horizontal seismic action of the mass point at the $i^{th}$ storey, $G_i$ indicates the gravity load value of the mass point of the $i^{th}$ storey, $H_i$ indicates the calculated height of the mass point of the $i^{th}$ storey, and n indicates the total number of storeys of the structure.

When the number of the storeys of the structure is large, the horizontal seismic action calculated according to the above equation is smaller than that obtained by the modal decomposition method for response spectrum. For the purpose of correction, a concentrating force $\Delta F_n$ is added to the top of the structure, and $\Delta F_n = \delta_n F_{Ek}$ and $\delta_n$ indicate top-added seismic action coefficients.

Then, the horizontal seismic action on the mass point at the $i^{th}$ storey is:

$$F_i = \frac{H_i G_i}{\sum_{k=1}^{n} H_k G_k} F_{Ek}(1 - \delta_n). \tag{6}$$

Moreover, the ultrahigh-rise frame-shear structure is further simplified, and assuming that the mass of each storey is equal, the gravity load on each storey may be regarded as a constant. The horizontal seismic action on the building is shown in the following equation:

$$F_i = \frac{H_i}{\sum_{k=1}^{n} H_k} F_{Ek}(1 - \delta_n) = \frac{H_i}{H_{total}} F_{Ek}(1 - \delta_n). \tag{7}$$

Considering the elastic response of the building structure under the seismic action, the horizontal deformation of each storey is defined as the ratio of the horizontal shear force to the stiffness of the storey. The deformation of the top of the building is the sum of the deformation of each storey, as shown in the equation below:

$$\Delta x = \sum_{i=1}^{n} \Delta x_i = \sum_{i=1}^{n} \frac{F_i}{K_{ix}} = \frac{F_{Ek}(1-\delta_n)}{H_{total}} \sum_{i=1}^{n}\left(\frac{H_i}{K_{ix}}\right) \tag{8}$$

$$\Delta y = \sum_{i=1}^{n} \Delta y_i = \sum_{i=1}^{n} \frac{F_i}{K_{iy}} = \frac{F_{Ek}(1-\delta_n)}{H_{total}} \sum_{i=1}^{n}\left(\frac{H_i}{K_{iy}}\right).$$

Here, $K_{ix}$ and $K_{iy}$ indicate the minor-axis stiffness and the major-axis stiffness at the $i^{th}$ storey respectively.

For the established priori model, the ratio of the minor-axis deformation to the major-axis deformation of the top of the building is:

$$\frac{\Delta x}{\Delta y} = \frac{\sum_{i=1}^{n}\left(\frac{H_i}{K_{ix}}\right)}{\sum_{i=1}^{n}\left(\frac{H_i}{K_{iy}}\right)}. \tag{9}$$

In step 6, based on the established priori model, the theoretical constraint equation between the deformation in the vertical and horizontal axes and the deformation component ($D_E$) in the east-west direction. Combined with the established equation for calculating the two-dimensional deformation quantity, the three-dimensional deformation relationship of the building in the settlement direction, the major-axis direction and the minor-axis direction is derived by fusing the theoretical constraint equation with the two-dimensional deformation value monitored by InSAR.

$$D_E = \Delta x \cos\beta + \Delta y \sin\beta \tag{10}$$
$$D_N = \Delta x \sin\beta + \Delta y \cos\beta$$
$$D_U = \Delta z.$$

Here, $\beta$ indicates an included angle between a horizontal axis of the building and a due east direction, and $\Delta x$, $\Delta y$, $\Delta z$ indicate minor-axis, major-axis and settlement deformations of the building respectively.

In an exemplary example, after the three-dimensional deformation data are acquired from steps 1 to 6, the method further includes: step 7, acquiring more reliable trend-directional three-dimensional deformation data by performing EMD processing on an acquired original three-dimensional deformation of the building and removing periodical deformations of the building caused by temperature effects.

The detailed process and effect of the embodiments of the present invention are presented below in combination with a specific high-rise building as an object of study. This exemplary embodiment shows a method for three-directional displacement monitoring of a building by fusion of InSAR data and physical knowledge includes. The method includes the steps as follows.

In step 1, the data of time-series LOS-directional deformation monitoring results from ascending and descending orbits are acquired for the region of study.

Figure 5:
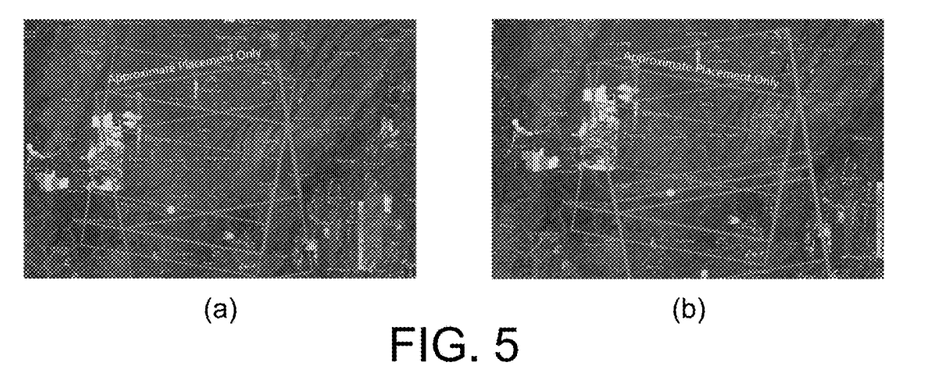
FIG. 5 shows maps of a positional relationship between an image coverage and a region of study according to an embodiment of the present invention, with (a) showing the data from an orbit 55 and (b) showing the data from an orbit 164.

With Tower 2 of Yingli International Financial Center in Chongqing, China, as the object of study, 283-scene Sentinel-1A satellite data are used, which include 155-scene ascending orbit data and 128-scene descending orbit data and are polarized in a VV mode and imaged in a wide strip mode. The details of orbits 55 and 164 in the Sentinel-1A data are shown in Table 1. In order to reduce the phase error caused by the orbit error, the orbit information is refined using the precise orbit data during data processing. FIG. 5 shows the relationship between the Sentinel-1A image coverage region of the ascending and descending orbits and the location of the region of study, in which the red box range is the SAR image coverage range, and the yellow dot is the location of the region of study.

TABLE 1

Details of Orbits 55 and 164 in Sentinel-1A data

| Orbit | Data Name | Orbit Type | Data Mode | Azimuth angle | Incidence angle |
|---|---|---|---|---|---|
| 55 | Sentinel-1A | Ascending orbit | Interferometric width (IW) | −9.8937662 | 43.9133 |
| 164 | Sentinel-1A | Descending orbit | Interferometric width (IW) | −169.2029949 | 33.8586 |

Figure 6:
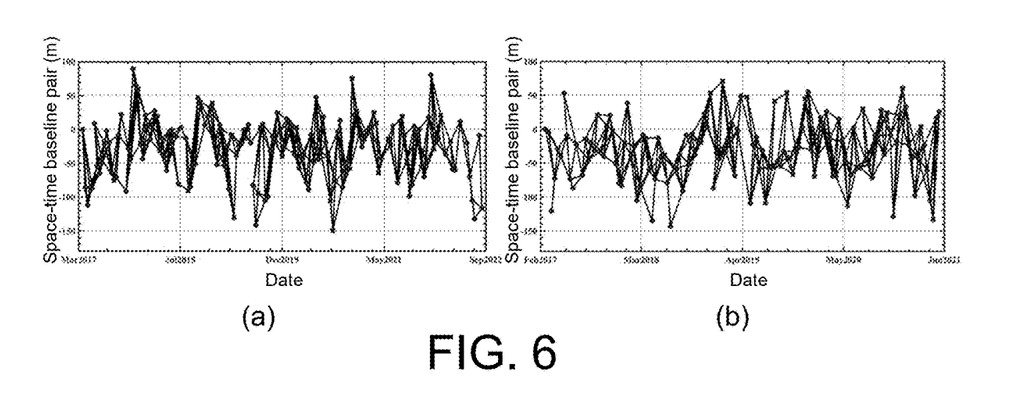
FIG. 6 shows schematic diagrams of space-time baseline pairs according to an embodiment of the present invention, with (a) showing the data from the orbit 55 and (b) showing the data from the orbit 164.

A series of data processing is conducted on the SAR images of the region where the object of study is located, by means of SBAS-InSAR. The specific processing flow includes: first, a small baseline interferometric dataset is constructed based on the principle of multi-primary images by using the small space and time baseline strategy. During the processing of ascending and descending orbit data, the time baseline threshold is set to 60 days, and the space baseline threshold is ±150 m. The data of the region of study from the ascending orbit is shown in (a) of FIG. 6, and the data from the descending orbit is shown in (b) of FIG. 6.

Figure 7:
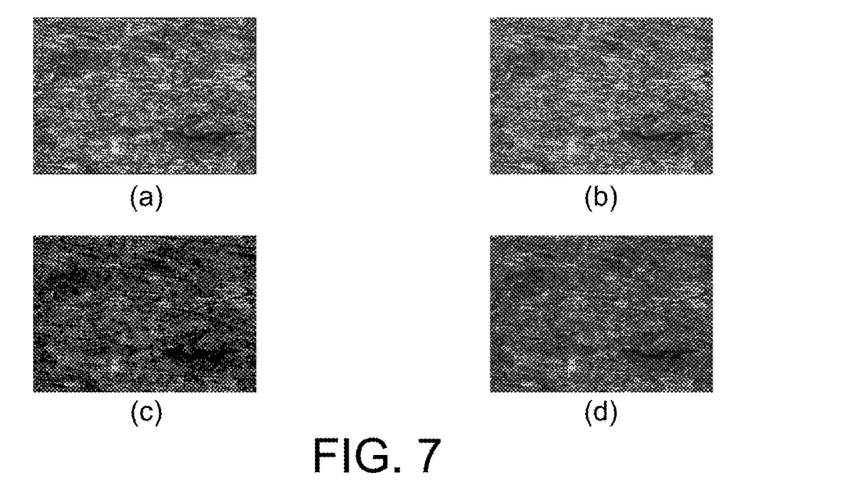
FIG. 7 shows processing graphs of 20200106-20200118 interferometric streams according to an embodiment of the present invention, with (a) showing a coherent graph, (b) showing an original differential interferogram. (c) showing an unwrapping graph, and (d) showing a post-filtering differential interferogram.

Next, after all images are registered to a super primary image, differential interferometry is conducted, which provides basis for subsequent processing by SBAS method. In order to suppress speckle noise, multi-view processing technique is used, and in order to ensure the quality of interferometry results and improve the clarity of the interferometry strips and the precision of phase unwrapping. Goldstein filtering is conducted to thus remove part of the noise phase and improve the signal-to-noise ratio of the interferogram. A minimum-cost flow (MCF) is used for the phase unwrapping. After the interferometry flow process is ended, a series of results such as a coherent coefficient diagram, an interferogram and an unwrapping result diagram were generated, as shown in FIG. 7.

Figure 8:
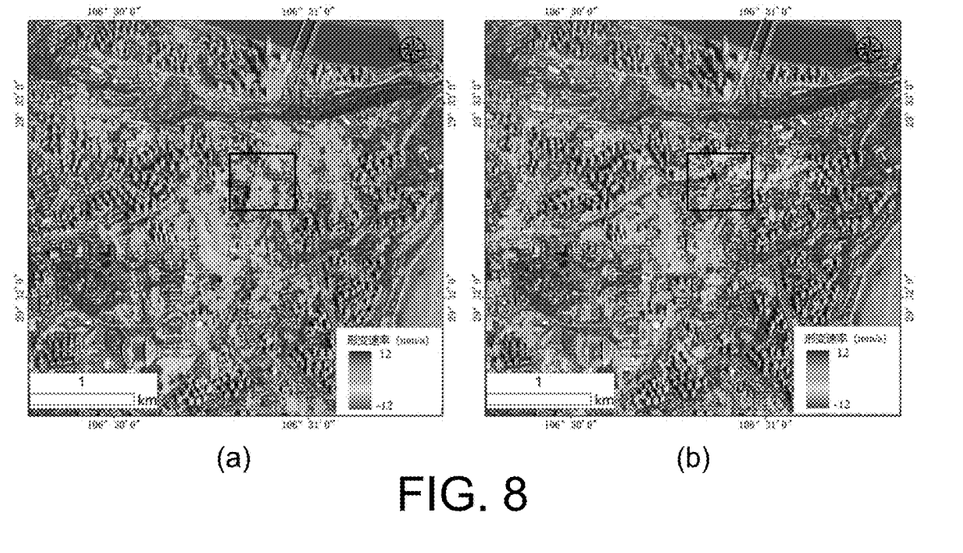
FIG. 8 shows distribution maps of an LOS-directional mean deformation rate according to an embodiment of the present invention, with (a) showing the deformation rate from the orbit 55 and (b) showing the deformation rate from the orbit 164.

Subsequently, a ground control point (CGP) is selected for orbit refinement and re flattening. In addition, taking advantage of the high spatial correlation and low time correlation, low-pass and high-pass filtering methods are respectively used to remove atmosphere components in the deformation phase, and then geocoding is conducted. The combined application of these steps results in the map of the average deformation rate distribution of the region of study in the LOS direction from two orbits (FIG. 8).

In step 2, time-unified LOS-directional time-series deformations from a plurality of orbits are calculated by using three cubic spline interpolations to perform time-dimensional interpolation on LOS-directional deformation datasets from ascending and descending orbits respectively.

The deformation quantity data of the ascending and descending orbits are collected, which include measurement values in the time dimension and the LOS direction; then, the data of the time dimension is preprocessed to ensure the data are ordered without missing; afterwards, a cubic spine interpolation coefficient is calculated three times to construct an interpolation function; the data of the time dimension is divided into a plurality of small intervals; afterwards, a cubic spline interpolation function is constructed three times, with each interval having an independent interpolation function therein; and for a time point to be interpolated, the interpolation function within a corresponding interval is used to perform cubic spline interpolation three times to obtain the deformation quantity value in the LOS direction.

In step 3, deformations in vertical and east-west directions are solved by establishing an observation equation based on interpolated multi-orbital LOS-directional deformations.

Figure 9:
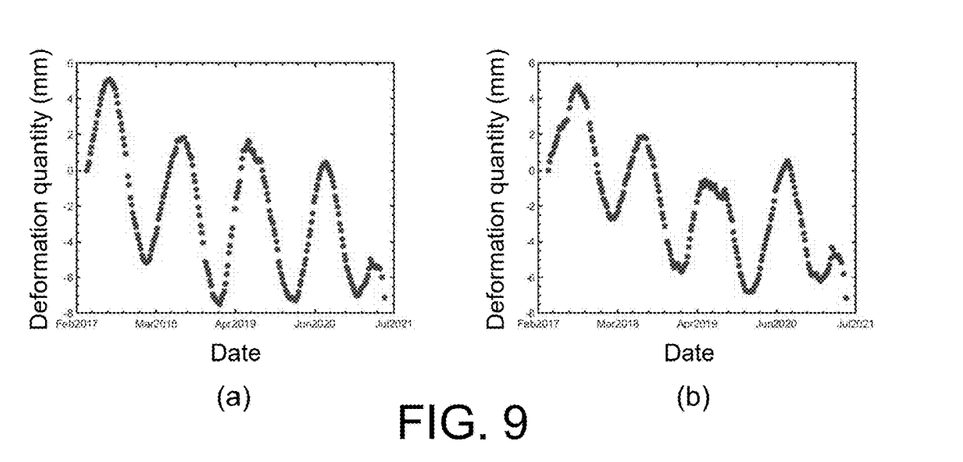
FIG. 9 shows two-dimensional deformation trend charts of a monitored point according to an embodiment of the present invention, with (a) showing a settlement deformation trend chart and (b) showing a deformation trend chart in an east-west direction.
Figure 10:
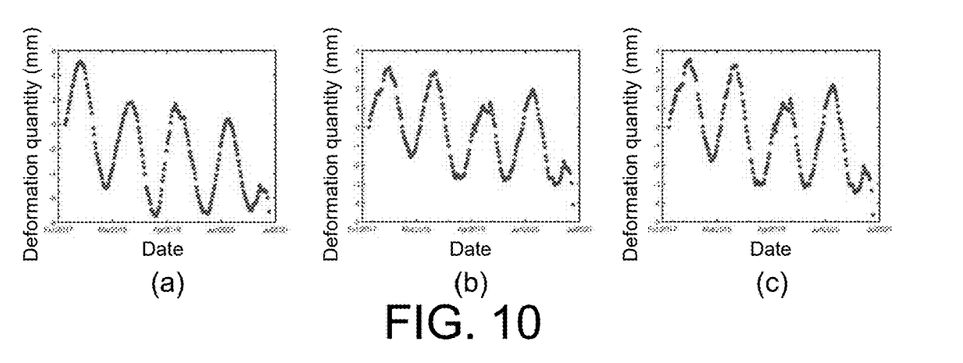
FIG. 10 shows three-dimensional original deformation charts of a building according to an embodiment of the present invention, with (a) showing a settlement deformation chart, (b) showing an x-axis deformation chart of the building, and (c) showing a y-axis deformation chart of the building.

According to the satellite-related data information provided in Table 1, the specific parameters of the Sentinel-1 satellite for scanning and imaging Chongqing can be clarified. Specifically, the flight azimuth angle a of the satellite at the ascending orbit is recorded as −9.89°, and the radar incidence angle θ1 of the satellite is 43.91°; and in case of the descending orbit, the flight azimuth angle a2 of the satellite is −169.20°, and the corresponding radar incidence angle θ2 is 33.86°. The above parameters of the satellite are combined with three cubic spline interpolations to obtain the LOS-directional deformation interpolation data from the ascending and descending orbits, and a corresponding equation is applied to obtain the deformation results of the monitored point in the east-west and vertical directions (settlement) (FIG. 9).

In step 4, the major-axis stiffness and minor-axis stiffness of each standard storey of a building structure are calculated according to a building structure plan.

The lateral stiffness of the structural storey can be briefly divided into the shear stiffness of the shear wall and the flexural stiffness of the column member, as shown in Equation (4), and the major-axis and minor-axis stiffness of each standard storey of the building is calculated according to the structure design drawing.

Based on the structure plan of the building, this embodiment calculates the stiffness of each storey of the building in the vertical and horizontal axes, and the detailed calculation results are summarized in Table 2 to provide key data related to the stiffness of the building structure.

TABLE 2

Stiffness information of each storey of building in vertical and horizontal axes

| Storey Number | $H_i$ (m) | $K_x$ | $K_y$ |
|---|---|---|---|
| 1 | 5.950 | 6.8891 | 6.5591 |
| 2 | 11.950 | 3.4743 | 3.1443 |
| 3 | 17.350 | 3.5745 | 3.2445 |
| 4 | 22.750 | | |
| 5 | 28.150 | | |
| 6 | 32.650 | 3.8063 | 3.4763 |
| 7 | 36.550 | 3.50953 | 3.16553 |
| 8 | 40.450 | | |
| 9 | 44.350 | | |
| 10 | 50.350 | 2.92605 | 2.58205 |
| 11 | 54.950 | 3.03611 | 2.69211 |
| 12 | 59.550 | | |
| 13 | 64.050 | 3.25808 | 2.91408 |
| 14 | 68.550 | | |
| 15 | 73.050 | | |
| 16 | 77.550 | | |
| 17 | 82.050 | 2.93288 | 2.20382 |
| 18 | 86.550 | | |
| 19 | 91.050 | | |
| 20 | 95.550 | | |
| 21 | 100.050 | | |
| 22 | 104.550 | 2.69057 | 1.96589 |
| 23 | 109.250 | 2.61352 | 1.90023 |
| 24 | 113.950 | | |
| 25 | 119.950 | 2.31568 | 1.7061 |

TABLE 2-continued

Stiffness information of each storey of
building in vertical and horizontal axes

| Storey Number | $H_i$ (m) | $K_x$ | $K_y$ |
|---|---|---|---|
| 26 | 124.450 | 2.69057 | 1.96589 |
| 27 | 129.150 | 2.61352 | 1.90023 |
| 28 | 133.650 | 2.01269 | 1.67046 |
| 29 | 138.150 | | |
| 30 | 142.650 | | |
| 31 | 147.150 | | |
| 32 | 151.650 | 1.49675 | 1.32245 |
| 33 | 156.150 | | |
| 34 | 160.650 | | |
| 35 | 165.150 | | |
| 36 | 169.650 | 1.38933 | 1.34231 |
| 37 | 174.150 | | |
| 38 | 178.850 | 1.36303 | 1.321 |
| 39 | 183.550 | | |
| 40 | 189.550 | 1.28525 | 1.258 |
| 41 | 194.250 | 1.36303 | 1.321 |
| 42 | 198.750 | | |
| 43 | 203.250 | | |
| 44 | 207.750 | | |
| 45 | 212.250 | 1.20777 | 1.13839 |
| 46 | 216.750 | | |
| 47 | 221.250 | 1.15089 | 0.99864 |
| 48 | 226.250 | | |
| 49 | 231.250 | 0.95267 | 0.93592 |

In step 5, a ratio of a major-axis-directional deformation to a minor-axis-directional deformation is 1.133, which is obtained by establishing a priori model of the building structure using physical knowledge of the Equivalent Lateral Force method and based on the stiffness of each storey from the building structure plan.

In step 6, a deformation displacement of the building structure in a south-north direction is solved in combination with deformation results in the vertical and east-west directions and the priori model of building structure deformations.

Based on the deformation data of the building in the east-west direction as obtained by InSAR two-dimensional decomposition and the deformation ratio of the building between the vertical and horizontal axes as derived by the established priori model, we can obtain the detailed deformation information of the building in both directions of its vertical and horizontal axes. At the same time, in this embodiment, the actually measured included angle between the vertical and horizontal axes of the building and the coordinates system is 11.25°, and the comprehensive information of the three-dimensional deformation of the building can be obtained in combination with the settlement deformation data of the building as acquired by the interferometric synthetic aperture radar (InSAR) technique. The three-dimensional deformation diagram of the building of Yingli in Chongqing.

In step 7, EMD processing is performed on an acquired original three-dimensional deformation of the building, and periodical deformations of the building caused by temperature effects are removed.

Figure 11:
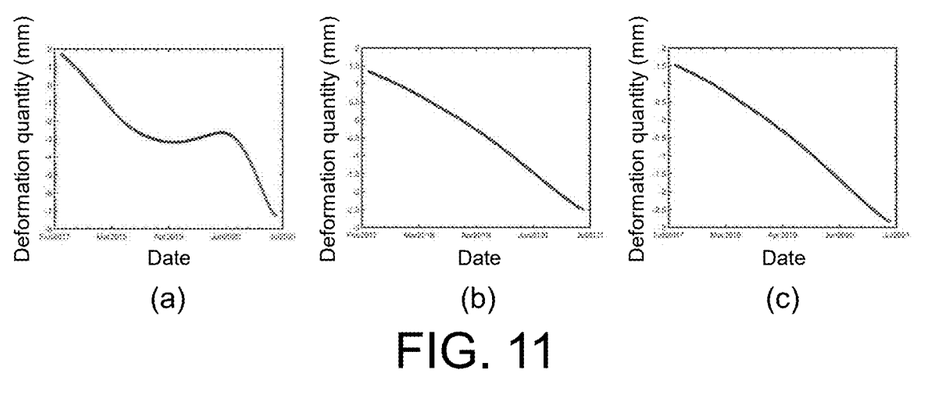
FIG. 11 shows three-dimensional trend deformation charts of a building according to an embodiment of the present invention, with (a) showing a settlement deformation trend chart, (b) showing an x-axis deformation trend chart of the building, and (c) showing a y-axis deformation trend chart of the building.

The trend-directional deformation results obtained after empirical mode decomposition (EMD) of the three-dimensional deformation of the building are shown in FIG. 11. As can be seen from these results, the building as a whole shows a decline trend, and its settlement quantity continuously increases over time. In addition, the deformations of the building in the vertical and horizontal axes also show a continuously increasing trend. This may be due to uneven settlement caused by the design of the building per se, or due to the deformation in a specific direction caused by wind direction or other environmental factors of the region where the building is located. Considering comprehensively, it can be considered that the trend deformation results of the building as obtained in this embodiment are reasonable and reflect the actual deformation of the building under specific conditions.

Based on the same inventive conception, an embodiment of the present invention discloses a system for three-directional displacement monitoring of a building by fusion of InSAR data and physical knowledge to implement the method as defined above. The system includes: an LOS-directional deformation calculation module for acquiring a time-series LOS-directional deformation displacement of a region of study, where a building to be monitored is located, from each orbit based on periodical observation data of an SAR satellite; an interpolation module for calculating time-unified LOS-directional time-series deformations from a plurality of orbits by performing time-dimensional interpolation on LOS-directional deformation datasets from ascending and descending orbits respectively; a vertical-/east-west-directional deformation solving module for solving deformations in vertical and east-west directions by establishing an observation equation based on interpolated multi-orbital LOS-directional deformations; a stiffness calculation module for calculating major-axis stiffness and minor-axis stiffness of each standard storey of a building structure according to a building structure plan; a major-/minor-axis-directional deformation ratio calculation module for calculating a ratio of a major-axis-directional deformation to a minor-axis-directional deformation by establishing a priori model of the building structure by using physical knowledge of an Equivalent Lateral Force method and based on the building structure plan; and a south-north-directional deformation solving module for solving a deformation displacement of the building structure in a south-north direction in combination with deformation results in the vertical and east-west directions and the priori model of building structure deformations.

Based on the same inventive conception, an embodiment of the present invention discloses a computer system, which includes a memory, a processor and a computer program that is stored in the memory and runs on the processor. The computer program, when loaded to the processor, implements the steps of the method for three-directional displacement monitoring of a building by fusion of InSAR data and physical knowledge.

It will be appreciated by those skilled in the art that, unless otherwise defined, all terms used herein (including technical terms and scientific terms) have the same meanings as those generally understood by those of ordinary skills in the art to which the present invention belongs. It should also be understood that terms such as those defined in the general dictionaries should be understood as having the meanings consistent with those in the context of the prior art, and should not be interpreted in an idealized or overly formal meaning, unless otherwise defined as here.

The above embodiments are only to illustrate the technical concept of the present invention, and are not intended to limit the protection scope of the present invention. Any changes made based on the technical solutions in accordance with the technical concept proposed by the preset invention should fall within the protection scope of the present invention. The embodiments of the present invention are illustrated above in detail, and the present invention is not limited to the embodiments above. Without departing from the purpose of the present invention, a variety of variations can be made within the range of knowledge as possessed by those of ordinary skills in the art.

What is claimed is:

1. A method for three-directional displacement monitoring of a building by InSAR data and physical knowledge, comprising the steps of:
   step 1, acquiring, by a processor, a time-series LOS-directional deformation displacement of a region of study, where a building to be monitored is located, from each orbit based on periodical observation data of an SAR satellite;
   step 2, calculating, by the processor, time-unified LOS-directional time-series deformations from a plurality of orbits by performing time-dimensional interpolation on LOS-directional deformation datasets from ascending and descending orbits respectively;
   step 3, solving, by the processor, deformations in vertical and east-west directions by establishing an observation equation based on interpolated multi-orbital LOS-directional deformations;
   step 4, calculating, by the processor, major-axis stiffness and minor-axis stiffness of each standard storey of a building structure according to a building structure plan; wherein overall lateral stiffness of a structural storey comprises shear stiffness of a shear wall and flexural stiffness of a column member;
   step 5, calculating, by the processor, a ratio of a major-axis-directional deformation to a minor-axis-directional deformation by establishing a priori model of the building structure using physical knowledge of an Equivalent Lateral Force method and based on the building structure plan; and
   step 6, solving, by the processor, a deformation displacement of the building structure in a north-south direction in combination with deformation results in the vertical and east-west directions and the priori model of building structure deformations;
   wherein in step 5, each storey of the building structure is regarded as an independent mass point, and according to the Equivalent Lateral Force method, a horizontal seismic action on a mass point of an $i^{th}$ storey is $$F_i = \frac{H_i G_i}{\sum_{k=1}^{n} H_k G_k} F_{Ek}(1 - \delta_n),$$

in which $H_i$ and $H_k$ indicate calculated heights of mass points, $G_i$ and $G_k$ indicate gravity load values of the mass points, $F_{Ek}$ indicates a standard value of a total horizontal seismic action of the structure, n indicates a total number of storeys of the structure, and $\delta_n$ indicates a top-added seismic action coefficient; and
   a horizontal deformation of each storey is defined as a ratio of a horizontal shear to the stiffness of the storey, a deformation at a top of the building is a sum of deformations of respective storeys, a minor-axis deformation at the top of the building is $$\Delta x = \sum_{i=1}^{n} \frac{F_i}{K_{ix}},$$

and a major-axis deformation at the top of the building is $$\Delta y = \sum_{i=1}^{n} \frac{F_i}{K_{iy}},$$

in which $K_{ix}$ and $K_{iy}$ indicate the minor-axis and major-axis stiffness of an $i^{th}$ storey,
   wherein the method for three-directional displacement monitoring of the building by InSAR data and physical knowledge is utilized to prevent a safety hazard of the building caused by a three-dimensional deformation,
   wherein a direct contact with the building is not required during step 1 to step 6, such that influence and damage to the building structure are avoided, thereby safety of the building is guaranteed.

2. The method for three-directional displacement monitoring of the building by InSAR data and physical knowledge according to claim 1, wherein in step 1, a plurality of SAR image data containing the region of the building to be monitored is acquired by periodical observation; and time-series processing is performed using a differential interferometry small baseline subset time-series analysis SBAS-InSAR method, to acquire the time-series LOS-directional deformation displacement of the region of study, where the building to be monitored, from each orbit.

3. The method for three-directional displacement monitoring of the building by InSAR data and physical knowledge according to claim 1, wherein in step 3, the observation equation is:

$$\begin{bmatrix} D_{LOS1} \\ D_{LOS2} \end{bmatrix} = \begin{bmatrix} \cos\theta_1 & -\sin\theta_1 & \sin\left(\partial_1 - \frac{3}{2}\pi\right) \\ \cos\theta_2 & -\sin\theta_2 & \sin\left(\partial_2 - \frac{3}{2}\pi\right) \end{bmatrix} \begin{bmatrix} D_U \\ D_E \end{bmatrix},$$

in which $D_{LOS1}$ and $D_{LOS2}$ indicate radar line of sight deformations from the ascending and descending orbits respectively, $D_U$ and $D_E$ indicate deformations in the vertical and east-west directions respectively, $\theta_1$ and $\theta_2$ indicate radar wave incidence angles of the ascending and descending orbits respectively, and $\partial_1$ and $\partial_2$ indicate satellite azimuth angles in the ascending and descending orbits respectively.

4. The method for three-directional displacement monitoring of the building by InSAR data and physical knowledge according to claim 1, wherein in step 4, the overall lateral stiffness K of the structural storey comprises the shear stiffness $$K_W = \frac{GA_W}{h}$$

of the shear wall and the flexural stiffness $$K_C = \frac{12EI_C}{h^3}$$

of the column member, in which G indicates a shear modulus of a material used in the member, E indicates an elastic modulus of the material used in the member, $A_W$ indicates an effective cross-sectional area of the shear wall in a calculated direction, h indicates a structural storey height, and $I_C$ indicates a horizontal cross-sectional moment of inertia of a column.

5. The method for three-directional displacement monitoring of the building by InSAR data and physical knowledge according to claim 1, wherein in step 5, a mass of each storey is assumed to be identical, a gravity load of each storey is regarded as a constant, and a ratio of the minor-axis deformation to the major-axis deformation of the top of the building is $$\frac{\Delta x}{\Delta y} = \frac{\sum_{i=1}^{n}\left(\frac{H_i}{K_{ix}}\right)}{\sum_{i=1}^{n}\left(\frac{H_i}{K_{iy}}\right)}.$$

6. A system for implementing the method for three-directional displacement monitoring of the building by InSAR data and physical knowledge according to claim 1, comprising:
   an LOS-directional deformation calculation module for acquiring the time-series LOS-directional deformation displacement of the region of study, where the building to be monitored is located, from each orbit based on the periodical observation data of the SAR satellite;
   an interpolation module for calculating the time-unified LOS-directional time-series deformations from the plurality of orbits by performing time-dimensional interpolation on the LOS-directional deformation datasets from the ascending and descending orbits respectively;
   a vertical-/east-west-directional deformation solving module for solving deformations in the vertical and east-west directions by establishing the observation equation based on interpolated multi-orbital LOS-directional deformations;
   a stiffness calculation module for calculating the major-axis stiffness and the minor-axis stiffness of each standard storey of the building structure according to the building structure plan;
   a major-/minor-axis-directional deformation ratio calculation module for calculating the ratio of the major-axis-directional deformation to the minor-axis-directional deformation by establishing the priori model of the building structure by using physical knowledge of the Equivalent Lateral Force method and based on the building structure plan; and
   a north-south-directional deformation solving module for solving the deformation displacement of the building structure in the north-south direction in combination with the deformation results in the vertical and east-west directions and the priori model of building structure deformations,
   wherein the LOS-directional deformation calculation module, the interpolation module, the vertical-/east-west-directional deformation solving module, the stiffness calculation module, the major-/minor-axis-directional deformation ratio calculation module, and the north-south-directional deformation solving module are executed by the processor.

7. A computer system, comprising a memory, a processor and a computer program that is stored in the memory and runs on the processor, wherein the computer program, when loaded to the processor, implements the steps of the method for three-directional displacement monitoring of the building by InSAR data and physical knowledge according to claim 1.

* * * * *